United States Patent
Hikita et al.

(10) Patent No.: US 6,742,117 B1
(45) Date of Patent: May 25, 2004

(54) IC CARD AND METHOD OF USING IC CARD

(75) Inventors: Junichi Hikita, Kyoto (JP); Yoshihiro Ikefuji, Kyoto (JP); Toyokazu Komuro, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/341,697

(22) PCT Filed: Jan. 9, 1998

(86) PCT No.: PCT/JP98/00061

§ 371 (c)(1),
(2), (4) Date: Jul. 26, 1999

(87) PCT Pub. No.: WO98/34193

PCT Pub. Date: Aug. 6, 1998

(30) Foreign Application Priority Data

Jan. 30, 1997 (JP) ............................................. 9-16353

(51) Int. Cl.⁷ ............................................. G06K 19/00
(52) U.S. Cl. ................. 713/172; 713/159; 713/187; 713/200; 235/375; 235/492; 235/454; 703/23
(58) Field of Search .................. 713/159, 187, 713/172, 200; 380/52, 28, 30; 705/66; 902/2, 5, 24, 26, 9; 235/375, 379, 380, 491, 492, 493, 487, 454, 468, 438

(56) References Cited

U.S. PATENT DOCUMENTS

| | | | | |
|---|---|---|---|---|
| 4,650,975 A | * | 3/1987 | Kitchener | 235/375 |
| 4,723,284 A | * | 2/1988 | Munck et al. | 371/159 |
| 4,839,504 A | * | 6/1989 | Nakano | 235/379 |
| 4,845,351 A | * | 7/1989 | Hara et al. | 235/492 |
| 4,910,774 A | | 3/1990 | Barakat | |
| 5,014,312 A | | 5/1991 | Lisimaque et al. | |
| 5,442,165 A | * | 8/1995 | Atsumi et al. | 235/492 |
| 5,548,106 A | * | 8/1996 | Liang et al. | 235/454 |
| 5,590,306 A | | 12/1996 | Watanabe et al. | |
| 5,664,157 A | * | 9/1997 | Takahira et al. | 703/23 |
| 5,679,945 A | * | 10/1997 | Renner et al. | 235/492 |

FOREIGN PATENT DOCUMENTS

| | | |
|---|---|---|
| DE | 195 22 050 A1 | 12/1996 |
| EP | 0 152 024 | 8/1985 |
| EP | 0 361 491 | 4/1990 |
| EP | 0 501 245 A2 | 9/1992 |
| FR | 2 726 381 | 5/1996 |
| JP | 56-38650 | 4/1981 |
| JP | 60-37069 | 2/1985 |
| JP | 60-183692 | 9/1985 |
| JP | 62-226351 | 10/1987 |
| JP | 2-5160 | 1/1990 |
| JP | 2-120951 | 5/1990 |
| JP | 3-208192 | 9/1991 |
| JP | 5-173888 | 7/1993 |
| JP | 7-73110 | 3/1995 |
| JP | 8-115266 | 5/1996 |

* cited by examiner

Primary Examiner—Ly V. Hua
(74) Attorney, Agent, or Firm—Arent Fox Kintner Plotkin & Kahn

(57) ABSTRACT

A private key write control unit (48) permits writing of a private key just once into a private key storage unit (36) after initialization. Similarly, a particular data write control unit (42) permits writing of particular data only once into a data storage unit (34) after initialization. Since a person other than the IC card manufacturer can write in a private key or particular data after the fabrication stage of the IC card, flexibility in the application of IC cards can be ensured. Also, improper usage of a card can be prevented since the written data is inhibited of being rewritten. The IC card manufacturer can initialize the data storage unit (34) and the private key storage unit (36) by a data initialization unit (44) and a private key initialization unit (46). Therefore, the cost of an IC card can be reduced by allowing reusage of IC cards.

10 Claims, 17 Drawing Sheets

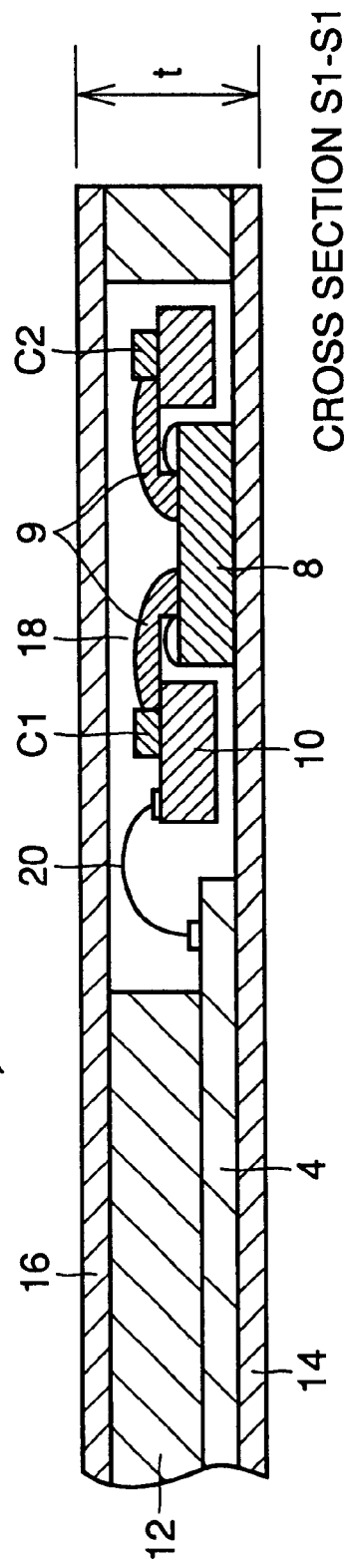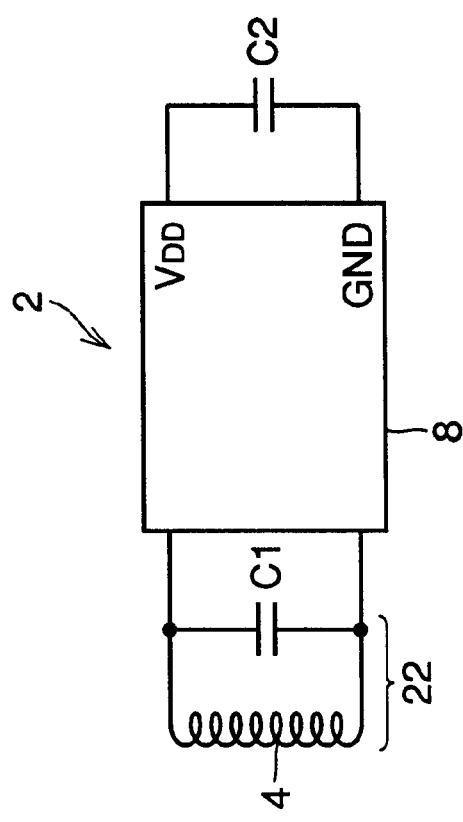
*FIG. 17A* PRIOR ART
*FIG. 17B* PRIOR ART

IC CARD AND METHOD OF USING IC CARD

TECHNICAL FIELD

The present invention relates to an IC card and a method of using an IC card. Particularly, the present invention relates to an IC card and an IC card usage method improved in security.

BACKGROUND ART

A communication system using a non-contact type IC card is employed in the automatic examination for lifts in skiing grounds and railroads, automatic sorting of parcels, and the like. An example of a conventional non-contact type IC card is shown in FIG. 16. An IC card 2 shown in FIG. 16 is a one-coil type IC card, including a coil 4 functioning as an antenna, capacitors C1 and C2, and an IC chip 8.

Capacitors C1, C2 and IC chip 8 are mounted on a film-like synthetic resin substrate. The substrate mounted with capacitors C1, C2 and IC chip 8 is referred to as a tab (tape automated bonding) 10.

FIG. 17A is a sectional view of IC card 2 taken along S1—S1 of FIG. 16. A core member 12 formed of synthetic resin is sandwiched by a pair of surface layer members 14 and 16. Tab 10 mounted with capacitors C1, C2 and IC chip 8 is fixed at surface layer member 14 exposed within a cavity 18 provided in core member 12. The junction portion of tab 10 and IC chip 8 is covered with an encapsulant 9 such as of epoxy resin.

Coil 4 is located between surface layer member 14 and core member 12. Coil 4 and tab 10 are connected by a wire 20.

FIG. 17B shows a circuit diagram of IC card 2. IC card 2 receives an electromagnetic wave sent from a reader/writer (an interrogator not shown) by a resonant circuit 22 formed by coil 4 and capacitor C1 as the power source. Capacitor C2 is the capacitor for smoothing power.

The information sent in an overlapping manner with the electromagnetic wave is decoded by a control unit (not shown) provided in IC chip 8, whereby the contents of a nonvolatile memory (not shown) provided in IC chip 8 is rewritten, and a response is sent back to the reader/writer. This response is effected by altering the impedance of resonant circuit 22. The reader/writer identifies the contents of the response by detecting change in impedance (impedance reflectance) of its own resonant circuit (not shown) corresponding to the impedance change of resonant circuit 22 of IC card 2.

By using such an IC card 2, data can be transmitted/received without requiring a power source in the card and in an non-contact manner.

A communication system using the above-described conventional IC card has problems set forth in the following. In a communication system using a conventional IC card, security is sought by encrypting the communication data between the reader/writer and the IC card. However, the data can be decoded and rewritten if the encryption is decoded. It is therefore difficult to ensure the security of the system by means of only the encryption.

There is an approach of preventing improper reproduction of an IC card of no further use by completely disabling data rewriting of the IC card of no further use. However, this will prevent recycling of the IC card, resulting in increase in the cost of IC cards.

An object of the present invention is to provide an IC card of high security and low cost, and a method of using an IC card, solving the above problems.

DISCLOSURE OF THE INVENTION

To achieve the above object, an IC card according to an aspect of the present invention includes a data communication unit for data communication with an interrogator, a data storage unit storing data, and an access control unit controlling access of the data storage unit according to the data obtained from the data communication unit. The access control unit includes a data initialization unit initializing the data storage unit according to a predetermined data initialization instruction obtained from the data communication unit, and a particular data write control unit providing control to allow predetermined particular data of card application to be written only once into the data storage unit that is initialized by the data initialization unit.

The IC card of the present invention is characterized in that the data storage unit is initialized according to a predetermined data initialization instruction to allow predetermined particular data of card application to be written only once onto the initialized data storage unit.

Therefore, the particular data once written into the data storage unit cannot be rewritten unless the data storage unit is initialized. Furthermore, the data storage unit can be initialized by only the person who knows the predetermined data initialization instruction. Therefore, unauthorized rewriting of particular data can be substantially prevented by distinguishing the person who can write in the particular data and the person who can initialize the data storage unit. Thus, the security of the card can be improved.

Since the card can be initialized in addition to prevent improper rewriting, recycling of the card is allowed. Therefore, the cost of the card can be reduced.

Preferably, the IC card further includes a private key storage unit to store a private key to access the particular data stored in the data storage unit. The access control unit further includes a particular data read out control unit to provide control to allow particular data to be read out only when the private key is input.

The IC card of the present invention is characterized by including a private key storage unit storing a private key to access particular data stored in the data storage unit to allow the particular data to be read out only when the private key is input.

The particular data can be read out only by the person who knows the private key for that particular data. By keeping this private key confidential, leakage of the particular data can be prevented. In other words, the security of the card is further improved.

Further preferably, a particular data write control unit provides control to allow particular data to be written only once into the data storage unit that is initialized by the data initialization unit only when the private key is input.

The IC card of the present invention is characterized in that the particular data can be written only once into the initialized data storage unit only when the private key is input.

Particular data can be written only by the person who has knowledge of the private key for the particular data. Therefore, writing of particular data other than an authorized person can be prevented by keeping the private key confidential.

Further preferably, the access control unit further includes a private key initialization unit initializing the private key storage unit according to a predetermined private key initialization instruction obtained from the data communication unit, and a private key write control unit providing control to allow the private key to be written only once into the private key storage unit that is initialized by the private key initialization unit.

The IC card of the present invention is characterized in that the private key can be written only once into the initialized private key storage unit according to a predetermined private key initialization instruction.

Therefore, the private key once written into the private key storage unit cannot be rewritten unless the private key storage unit is initialized. Only the person who has knowledge of the predetermined private key initialization instruction can initialize the private key storage unit. Unauthorized rewriting of the private key can be substantially prevented by distinguishing the person who can write in a private key and the person who can initialize the private key storage unit. Thus, the security of the card is further improved.

Since the card can be initialized in addition to preventing improper rewriting, recycling of the card is allowed. Therefore, the cost of the card can be further reduced.

Further preferably, the IC card is configured to allow the private key to be written only once into the private key storage unit.

According to the present invention, a private key once written cannot be erased. Therefore, improper usage of the card by rewriting the private key can be prevented.

Further preferably, the data storage unit can store a flag corresponding to particular data. The data initialization unit initializes the flag to a write enable state according to a data initialization instruction. The particular data write control unit provides control to allow particular data to be written into the data storage unit only when the flag is at a write enable state. The flag is set to a write disable state when particular data is written into the data storage unit.

The IC card of the present invention initializes each flag to a write enable state according to an initialization instruction corresponding to particular data. Particular data can be written into the data storage unit only when the relevant flag is at a write enable state. The relevant flag is set to a write disable state when particular data is written into the data storage unit.

By manipulating the flag corresponding to the particular data, the data storage unit can be initialized. Also, rewriting of particular data can be inhibited. Therefore, the security of the card can be easily improved. Also, the cost of the card can be reduced.

Further preferably, the data storage unit is characterized in that open data not limited in the number of reading or writing times can also be stored therein.

According to the present invention, data not critical of secrecy can also be stored.

The private key storage unit preferably stores a private key to access the open data stored in the data storage unit. The access control unit provides control to allow the open data to be rewritten only when the private key to access the open data is input.

The IC card of the present invention can have the open data rewritten only when the private key corresponding to the access of the open data stored in the data storage unit is input.

The open data can be rewritten only by the person who has knowledge of the private key for the open data. By keeping that private key confidential, the open data can be prevented from being rewritten by an unauthorized person.

Further preferably, the data initialization instruction is encrypted by a predetermined method. The data initialization unit is characterized in that the data storage unit is initialized only when the encrypted data is recognized as the data initialization instruction.

The data initialization instruction of the IC card is data encrypted by a predetermined method. The data storage unit is initialized only when the encrypted data is recognized as the data initialization instruction.

Only the person who has knowledge of the encrypted data encrypted by the predetermined method can initialize the data storage unit. The security of the card can be improved by using the relatively simple method of encryption to reduce the cost of the card.

Further preferably, the data communication unit carries out data communication with an interrogator via an electromagnetic wave in an electrically non-contact manner.

According to the present invention, the security of the so-called non-contact type IC card can be improved to reduce the cost of the card.

Preferably, the data initialization instruction is data having a predetermined frequency. The data initialization unit is characterized in that the data storage unit can be initialized only when the data having the predetermined frequency is recognized as the data initialization instruction.

According to the present invention, the data storage unit can be initialized only by the person who can apply the data having the predetermined frequency. In other words, initialization of the data storage unit becomes more difficult for one other than the predetermined authorized person.

Further preferably, the data communication unit is characterized in that data communication is carried out with an interrogator electrically in contact.

According to the present invention, the security of the so-called contact-type IC card can be improved to reduce the cost of the card.

According to another aspect of the present invention, a method of using an IC card that carries out data communication with an interrogator and that stores data is characterized in that initialization of an IC card is allowed only when a predetermined initialization condition is satisfied, predetermined particular data can be written only once into the initialized IC card, and the person effecting initialization and the person writing the particular data are distinguished.

According to the present invention, the particular data once written into an IC card cannot be rewritten unless the IC card is initialized. The IC card can be initialized only by the person who has knowledge of the predetermined initialization condition. The person effecting initialization and the person writing the particular data are distinguished from each other. Therefore, improper rewriting of the particular data can be substantially prevented. In other words, the security in the application of a card can be improved.

Furthermore, recycling of the card is allowed since the card can be initialized as well as preventing improper rewriting. Therefore, the cost in the application of cards can be reduced.

Further preferably, the person carrying out initialization is the manufacturer of the IC card. The person writing in the particular data is the manufacturer of the interrogator and the provider of the IC card. The manufacturer of the interrogator and the provider of the IC card are limited in the number of writing the predetermined particular data, i.e., only once, into the initialized IC card. The manufacturer of the IC card, the manufacturer of the interrogator and the provider of the IC card are respectively distinguished from each other.

According to the present invention, the manufacturer of the IC card that carries out initialization, the manufacturer of the interrogator that writes in particular data, and the provider of the IC card are distinguished from each other. Therefore, the security with respect to secrecy in the application of cards can be further improved.

Further preferably, the present invention is characterized in that a private key to access the particular data stored in the IC card can be read out only when the private key is applied from the interrogator.

According to the present invention, the particular data can be read out only by the person who has knowledge of the private key for that particular data. By keeping that private key confidential, leakage of the particular data can be prevented. The security in the application of the card can further be improved.

BRIEF DESCRIPTION OF THE DRAWINGS

FIG. 9 shows the contents of non-volatile memory 78 with a private key written in.

FIG. 11 shows the contents of non-volatile memory 78 with the particular data written in.

FIGS. 17A and 17B are a cross sectional view taken along S1—S1 of FIG. 16 and a circuit diagram of IC card 2, respectively.

BEST MODE FOR CARRYING OUT THE INVENTION

The present invention will be described with reference to the drawings in order to provide a more detailed description.

[First Embodiment]

Figure 1:
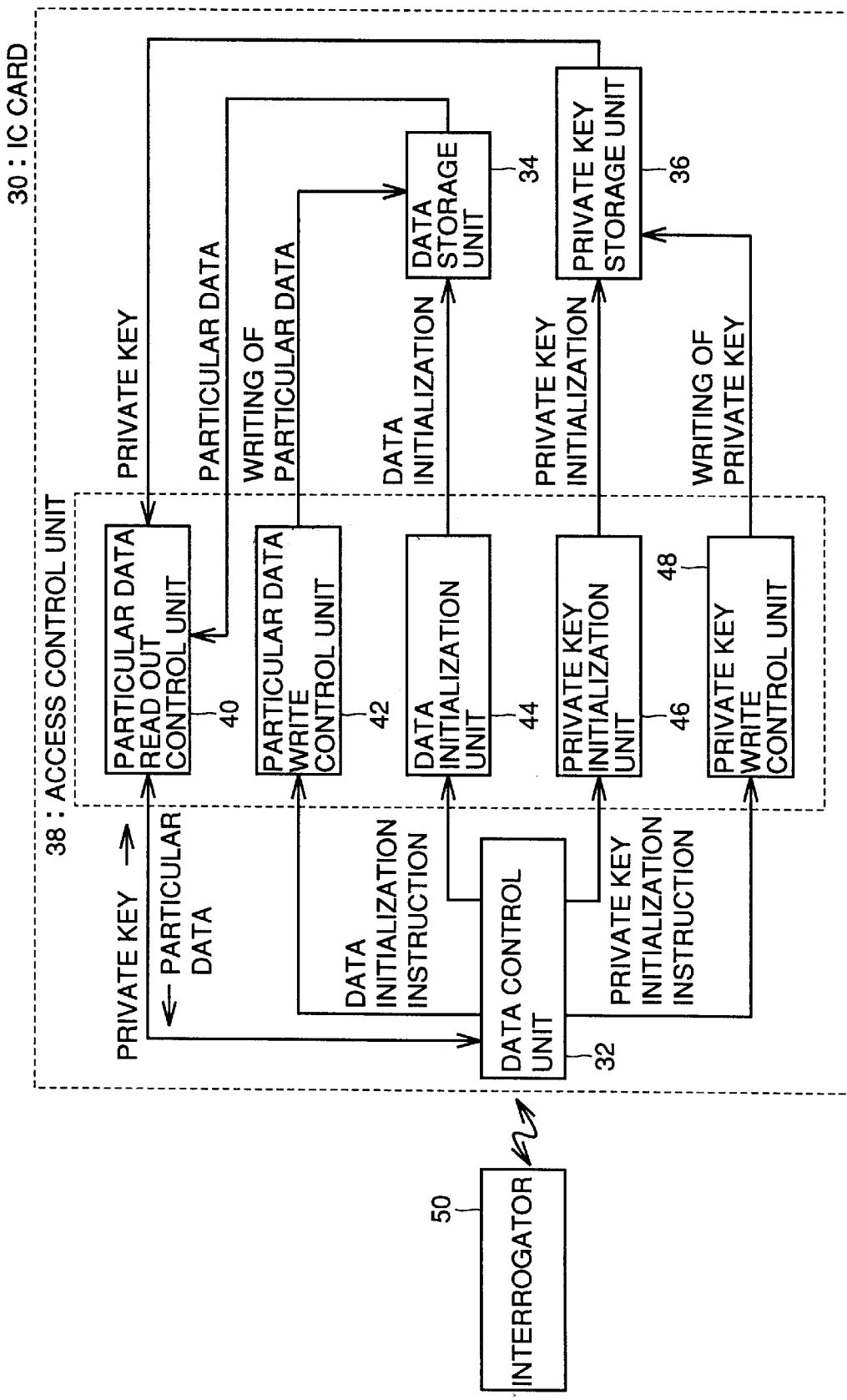
FIG. 1 shows an entire structure of an IC card according to a first embodiment of the present invention.

FIG. 1 is a block diagram showing an entire structure of an IC card 30 according to a first embodiment of the present invention. IC card 30 is a one-coil type IC card, used for automatic examination for lifts at skiing grounds and railroads, automatic sorting of parcels, and the like.

IC card 30 includes a data communication unit 32, a data storage unit 34, a private key (cryptogram key) storage unit 36, and an access control unit 38. Data communication unit 32 carries out data communication with an interrogator 50. Data storage unit 34 stores data. Private key storage unit 36 stores a private key to access the particular data stored in data storage unit 34.

Access control unit 38 controls the access towards data storage unit 34 and private key storage unit 36 according to the data obtained from data communication unit 32. Access control unit 38 includes a particular data read out control unit 40, a particular data write control unit 42, a data initialization unit 44, a private key initialization unit 46, and a particular data write control unit 48.

Data communication unit 32 receives a data initialization instruction and a private key initialization instruction, when applied, from interrogator 50. Data initialization unit 44 responds to a data initialization instruction to initialize the stored contents of data storage unit 34. Private key initialization unit 46 responds to a private key initialization instruction to initialize the private key stored in private key storage unit 36. An IC card 30 of such an initialized state is delivered to the business proprietor that uses/operates the card.

The business proprietor using the card writes in a private key from interrogator 50 into IC card 30. This private key is applied to private key write control unit 48 via data communication unit 32. Private key write control unit 48 provides control to write the private key into private key storage unit 36. Control is provided by private key write control unit 48 to allow such a private key to be written only once. Therefore, one other than the business proprietor employing the card is inhibited from rewriting this private key.

The business proprietor employing the card writes particular data from interrogator 50 into IC card 30. This particular data is applied to particular data write control unit 42 via data communication unit 32. Particular data write control unit 42 provides control to write the particular data into data storage unit 34. Control is provided by particular data write control unit 42 to allow the particular data to be written only once. Therefore, one other than the business proprietor employing the card cannot rewrite the particular data.

In the usage of the card, the private key is transmitted when the particular data stored in data storage unit 34 is needed by one at the interrogator 50 side. This private key is applied to particular data read out control unit 40 via data communication unit 32. Particular data read out control unit 40 reads out the private key from private key storage unit 36 and determines whether the read out private key matches the transmitted private key. If they do not match, the read out of particular data from data storage unit 34 is denied. Accordingly, secrecy of the particular data can be protected from a person who does not know the private key. When the private keys match, the particular data is read out from data storage unit 34 to be sent to interrogator 50 via data communication unit 32.

By applying a data initialization instruction and a private key initialization instruction to IC card 30, that IC card 30 can be used again. Improper usage of the card can be prevented by keeping this data initialization instruction and private key initialization instruction confidential except for the manufacturer of the IC card.

Figure 2:
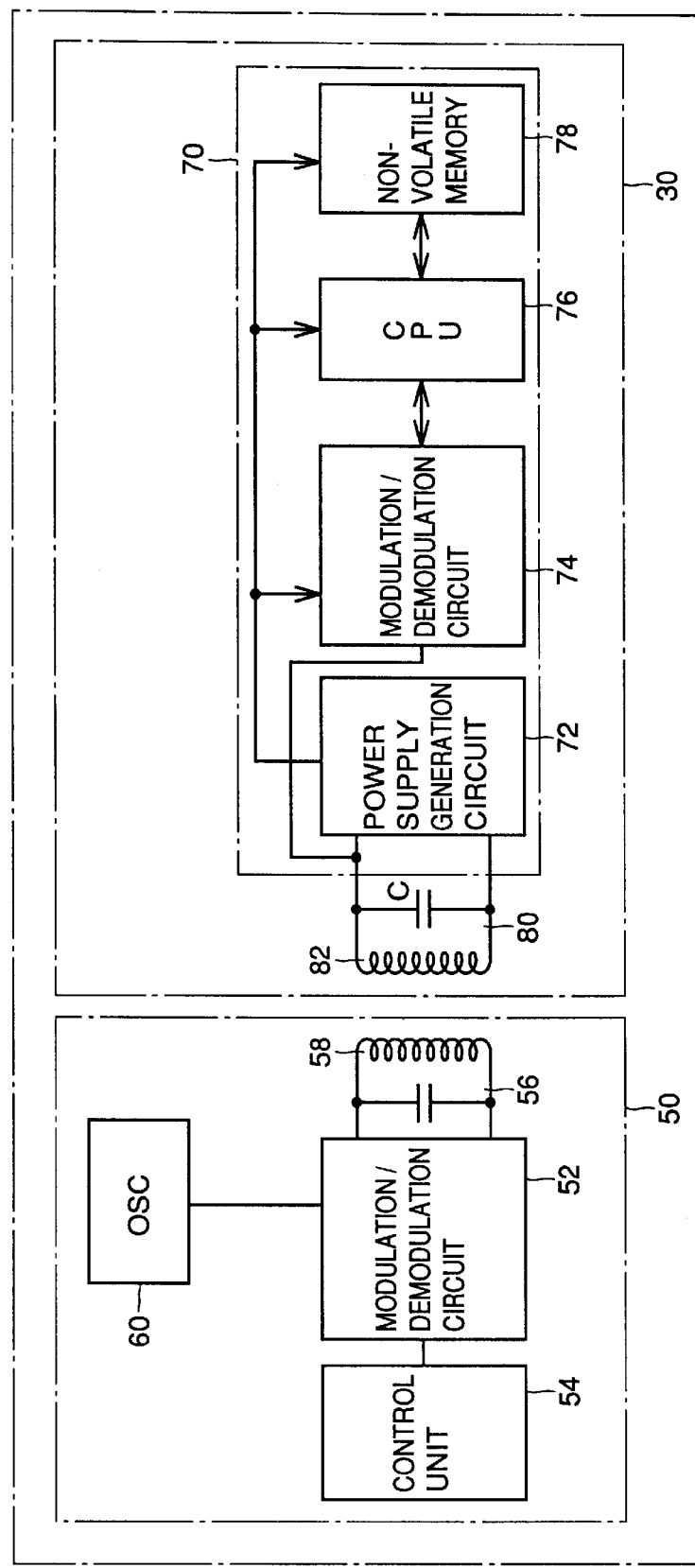
FIG. 2 shows a hardware structure where various functions of FIG. 1 are realized using a CPU.

FIG. 2 shows a hardware structure of the features of IC card 30 of FIG. 1, realized using a CPU. Under control of control unit 54, interrogator 50 sends out from antenna 56 a carrier wave of high frequency from an oscillation circuit (OSC) 60. Upon approach of IC card 30 to interrogator 50, this high-frequency carrier wave is received by antenna 82 of IC card 30. A power supply generation circuit 72 converts the received high frequency wave into DC power and supplies the same to other circuitry sections. Thus, IC card 30 is operable when nearing interrogator 50.

Transmission of information from interrogator 50 to IC card 30 is effected by modulating the high frequency carrier wave at a modulation/demodulation circuit 52 under control of control unit 54. IC card 30 demodulates the modulated carrier wave of high frequency at a modulation/demodulation circuit 74. CPU 76 obtains the demodulated information to carry out the required process such as rewriting the contents of non-volatile memory 78, sending back information, and the like.

In an opposite manner, information is transmitted from IC card 30 to interrogator 50. An oscillation circuit is not provided at the part of IC card 30. Therefore, a carrier wave of high frequency that is not modulated is sent out from interrogator 50, and the impedance of resonant circuit 80 is altered by modulation/demodulation circuit 74 at the part of IC card 30. Interrogator 50 detects this change in impedance by modulation/demodulation circuit 56 as an impedance change of its own resonant circuit 56. Control unit 54 obtains the demodulated information to carry out the required process.

Since power supply will be eliminated as IC card 30 recedes from interrogator 50, the operation of IC card 30 ceases. However, the stored information is retained due to non-volatile memory 78 even when no more power is supplied. In the present embodiment, an EPROM is used as non-volatile memory 78.

Figure 3:
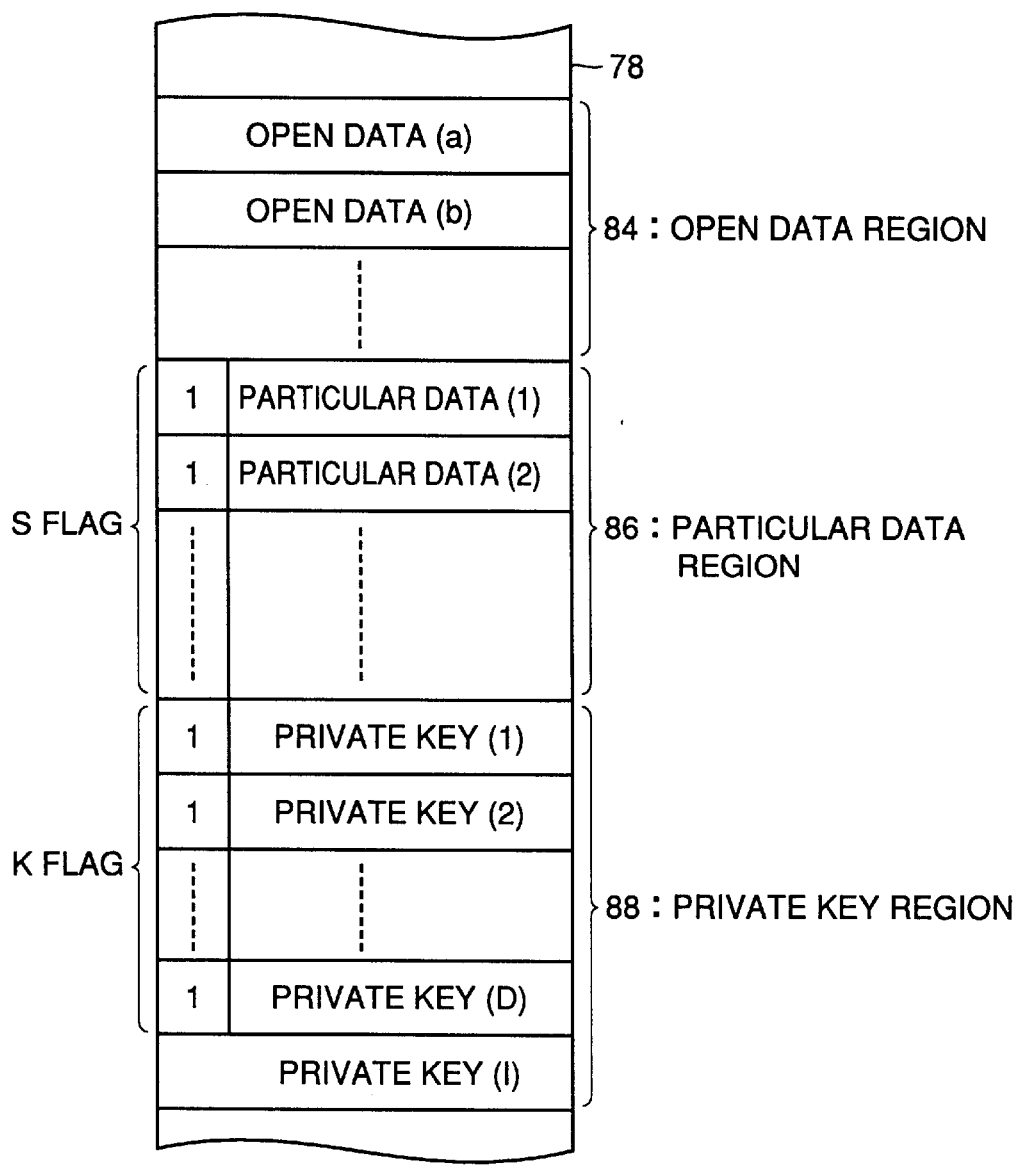
FIG. 3 shows the contents of a non-volatile memory 78 in the application of an IC card 30.

FIG. 3 shows the stored contents of non-volatile memory 78 in the usage of IC card 30. The case is considered where IC card 30 is used as a cash card of an non-contact type automated-teller machine (ATM). In this case, interrogator 50 is accommodated in the ATM as a portion thereof.

In an open data region 84, rewritable open data (a), (b), . . . of relatively low secrecy are stored. For example, transaction history and the like are stored as open data. In a particular data region 86, particular data (1), (2), . . . are stored. For example, the type of the non-contact card oriented ATM device, the ID number of the card user, and the like are stored as particular data. The particular data are written in by the manufacturer of the ATM or the bank which is the provider of the IC card. In a private key region 88, private keys (1), (2), . . . (D), (I) are stored. Private key (1), (2), . . . (D) are written in by the manufacturer of the ATM and the bank which is the provider. Private key (I) is written in by the manufacturer of the IC card.

The operation in the usage of IC card 30 will be described with reference to FIGS. 2–4. When a depositor carrying IC card 30 approaches an ATM, communication between IC card 30 and the ATM is allowed. The operation of interrogator 50 of the ATM is set forth in the following in order to obtain the open data (transaction history and the like) or the particular data (device type, ID number) stored in non-volatile memory 78 of IC card 30.

Interrogator 50 sends a data transfer instruction and a preset private key to IC card 30. More specifically, control unit 54 of interrogator 50 controls modulation/demodulation circuit 52 so that the carrier wave is modulated and sent out by the data transfer instruction and the private key. Modulation/demodulation circuit 74 of IC card 30 demodulates the data transfer instruction and the private key to apply the same to CPU 76. CPU 76 identifies that a data transfer instruction has been sent to execute the data transfer program. This program is stored in non-volatile memory 78.

Figure 4:
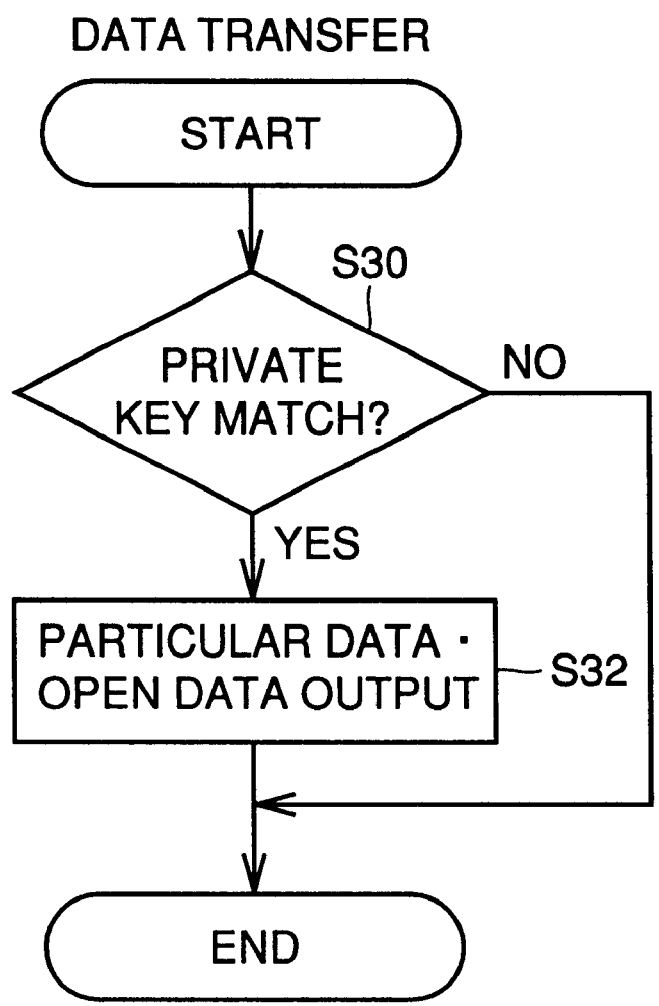
FIG. 4 is a flow chart of the process of data transfer.

The data transfer program is represented by the flow chart of FIG. 4. First, CPU 76 reads out a preset private key corresponding to data transfer (here, private key (1)) from private key region 88 of non-volatile memory 78. Then, determination is made whether the sent private key matches the read out private key (1) (step S30). If they do not match, the program ends without transferring data. More specifically, determination is made of a read out process by an unauthorized person who does not know the correct private key. Data transfer is refused. If the private keys match, the particular data or open data is read out from non-volatile memory 78. The read out data is modulated by modulation/demodulation circuit 74 to be sent to interrogator 50 (step S32). The ATM communicates with the center computer of the center station to carry out the process of cash withdrawal/deposit and the like according to the obtained data by interrogator 50. Thus, data is output in response to only a data transfer instruction from interrogator 50 that has the proper private key.

Upon completion of the transaction such as cash withdrawal/deposit, interrogator 50 transmits an instruction to update the transaction history stored in non-volatile memory 78 (data rewrite instruction) of IC card 30. In this case, interrogator 50 transmits a preset private key. CPU 76 of IC card 30 responds to this data rewrite instruction to execute a data rewrite program.

Figure 5:
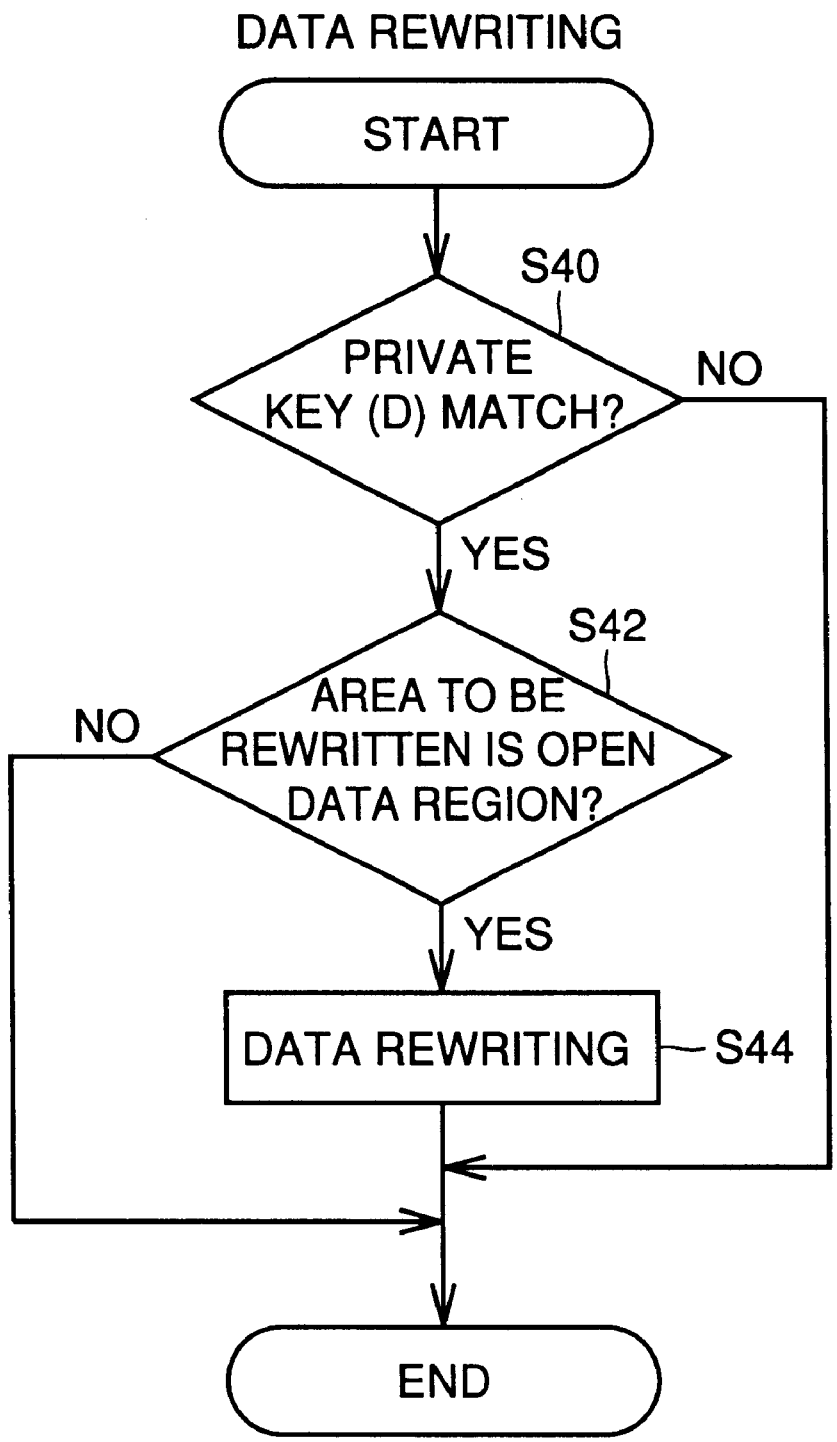
FIG. 5 is a flow chart of the process of data rewriting.

FIG. 5 is a flow chart of a data rewrite program. CPU 76 reads out from private key region 88 of non-volatile memory 78 a preset private key corresponding to data rewriting (here, private key (1)). Then, determination is made whether the transmitted private key matches the read out private key (1) (step 40). If they do not match, the program ends without writing the transaction data (data is not rewritten). Rewriting of transaction data is rejected upon the determination of a rewrite process by an unauthorized person who does not know the proper private key. If the private keys match, determination is made whether the region of interest corresponding to the data rewrite request is open data region 84 or not (step S42). In the case of a rewrite instruction with respect to open data region 84, the transaction history is rewritten according to the transmitted transaction data (step S44). In other words, the data stored in open data region 84 can be rewritten by the entry of a proper private key.

Only the open data region can be rewritten with respect to this data rewrite instruction. Other regions (particular data region and private key region) cannot be rewritten by this rewrite instruction. The writing and reading operation of the particular data region and private key region will be described afterwards.

For the above-described application of IC card 30, the private key and particular data must be able to be written in by the manufacturer of the ATM and the provider (bank) of IC card 30 delivered from the manufacturer of IC card 30. It is possible for the manufacturer of the IC card to write the private key and the particular data for shipment to the manufacturer of the ATM and the provider (bank). However, a pliable operation cannot be performed in such cases. The ATM maker and the provider (bank) will find the system difficult to use. In view of the foregoing, the present embodiment allows the private key and particular data to be written respectively by the ATM maker and the provider (bank).

Figure 7:
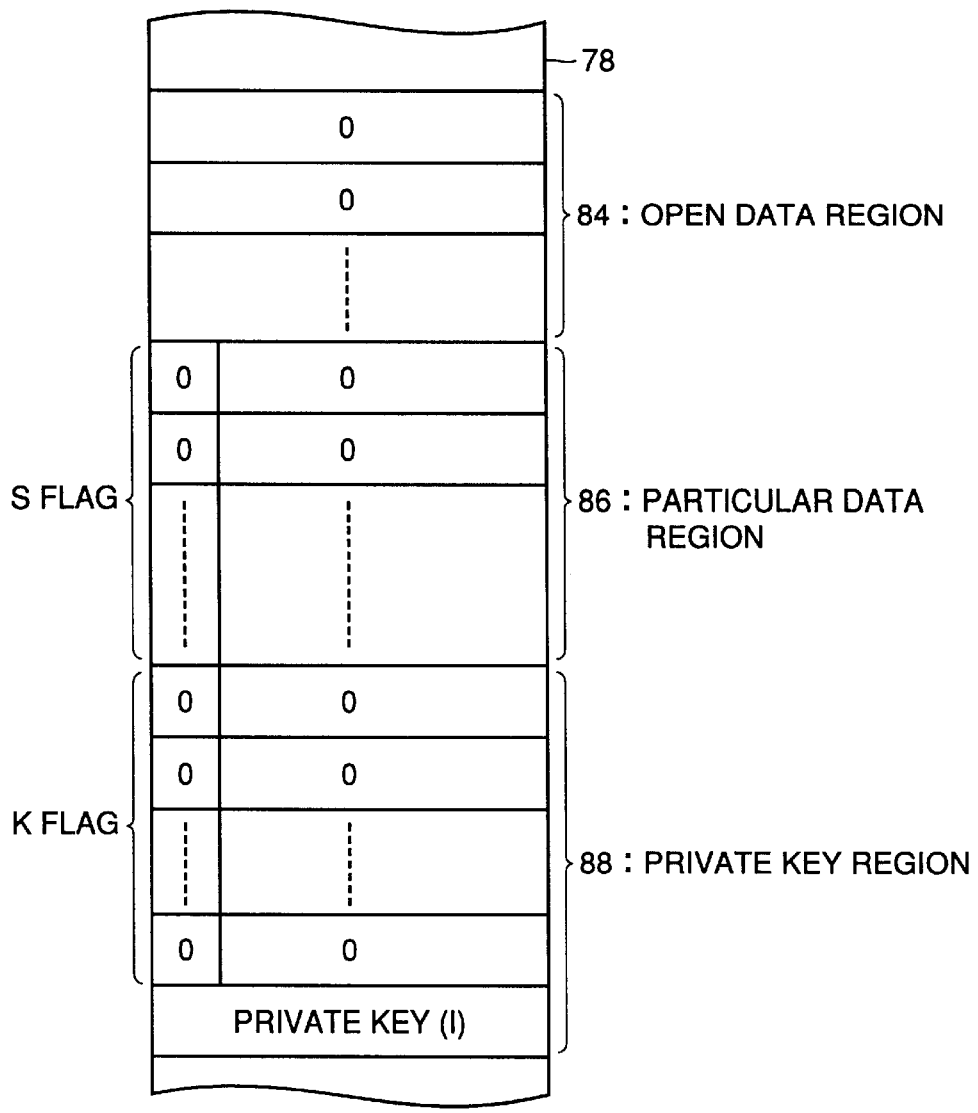
FIG. 7 shows the contents of non-volatile memory 78 of an initialized IC card.

The process of the ATM maker and provider (bank) writing in a private key and particular data respectively will be described hereinafter. The initial state of non-volatile memory 78 of IC card 30 delivered from the IC card maker is as shown in FIG. 7. It is appreciated from FIG. 7 that all data are initialized (here, "0") except for private key I that is known only by the manufacturer of the IC card.

Figure 8:
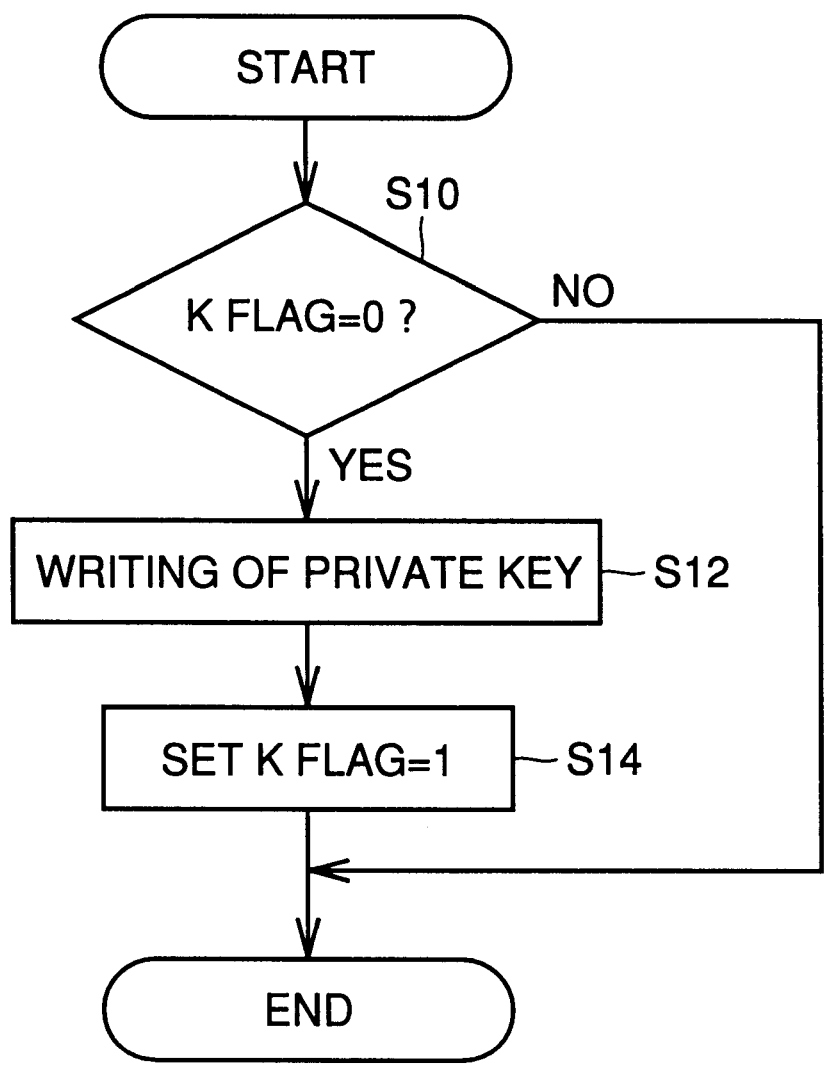
FIG. 8 is a flow chart of a private key writing process.

A private key and particular data are written through a reader/writer of interrogator 50 equal to that of the ATM in operation. More specifically, a private key write instruction is transmitted from interrogator 50 of the reader/writer (refer to FIG. 2). In response, CPU 76 of IC card 30 carries out the private key rewrite process of FIG. 8. First, determination is made whether the K flag of the area where the private key is to be written in private key region 88 is 0 or not (step S10). When the flag is 0, the transmitted private key is written into the relevant area of private key region 88 (step S12). Then, the K flag of that area is set to 1 (step S14). Thus, a private key can be written.

Figure 9:
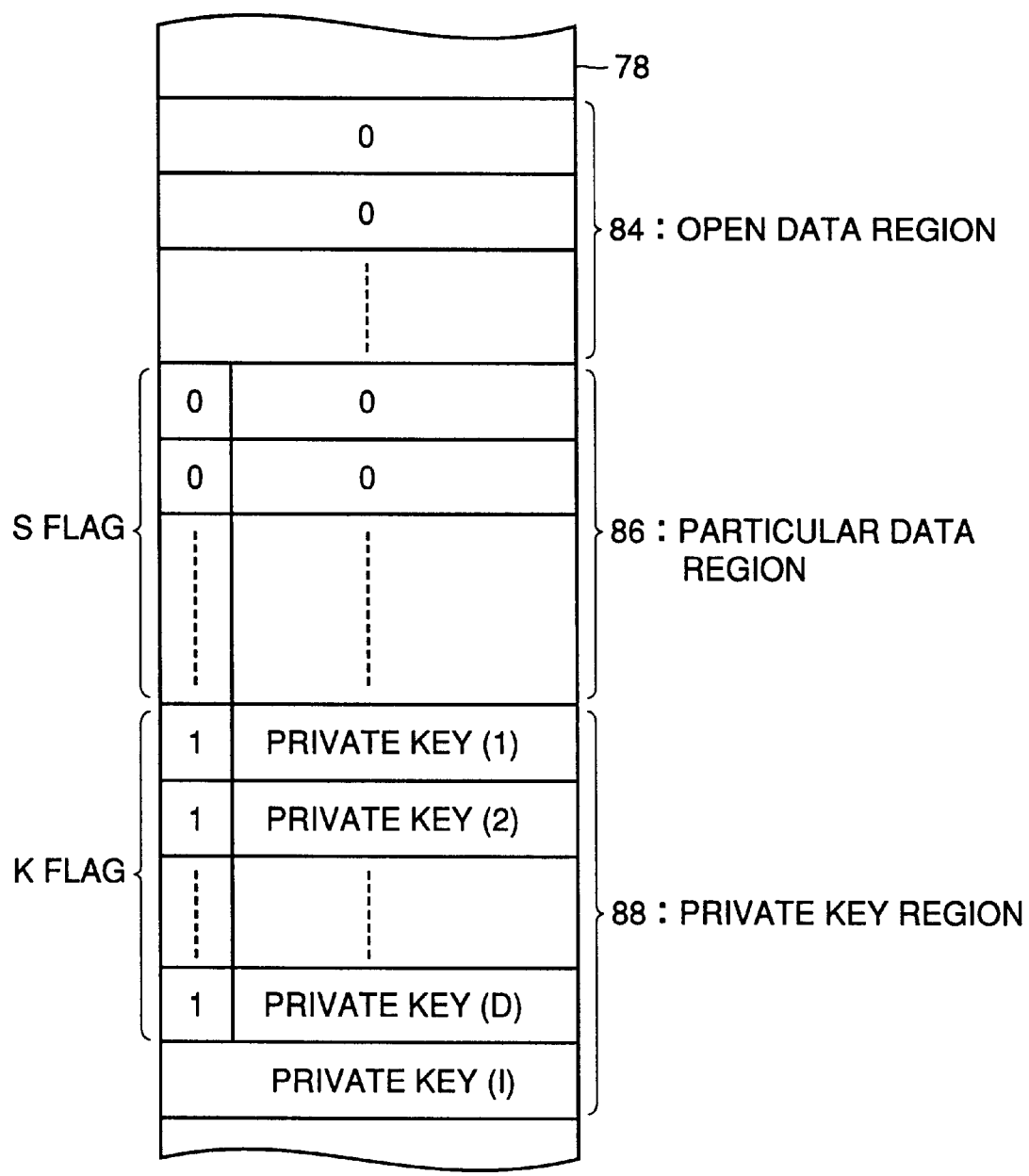

When an attempt is made to write into the area where the K flag is 1 indicating writing has already be performed, the program branches from step S10 to reject rewriting. Private key region 88 is provided to allow a plurality of private keys to be stored. Therefore, one business proprietor can set a plurality of private keys according to the processing contents, or two or more business proprietors (ATM maker, card provider, and the like) can set its own private key. The contents of non-volatile memory 78 having the private key written in are shown in FIG. 9.

Figure 10:
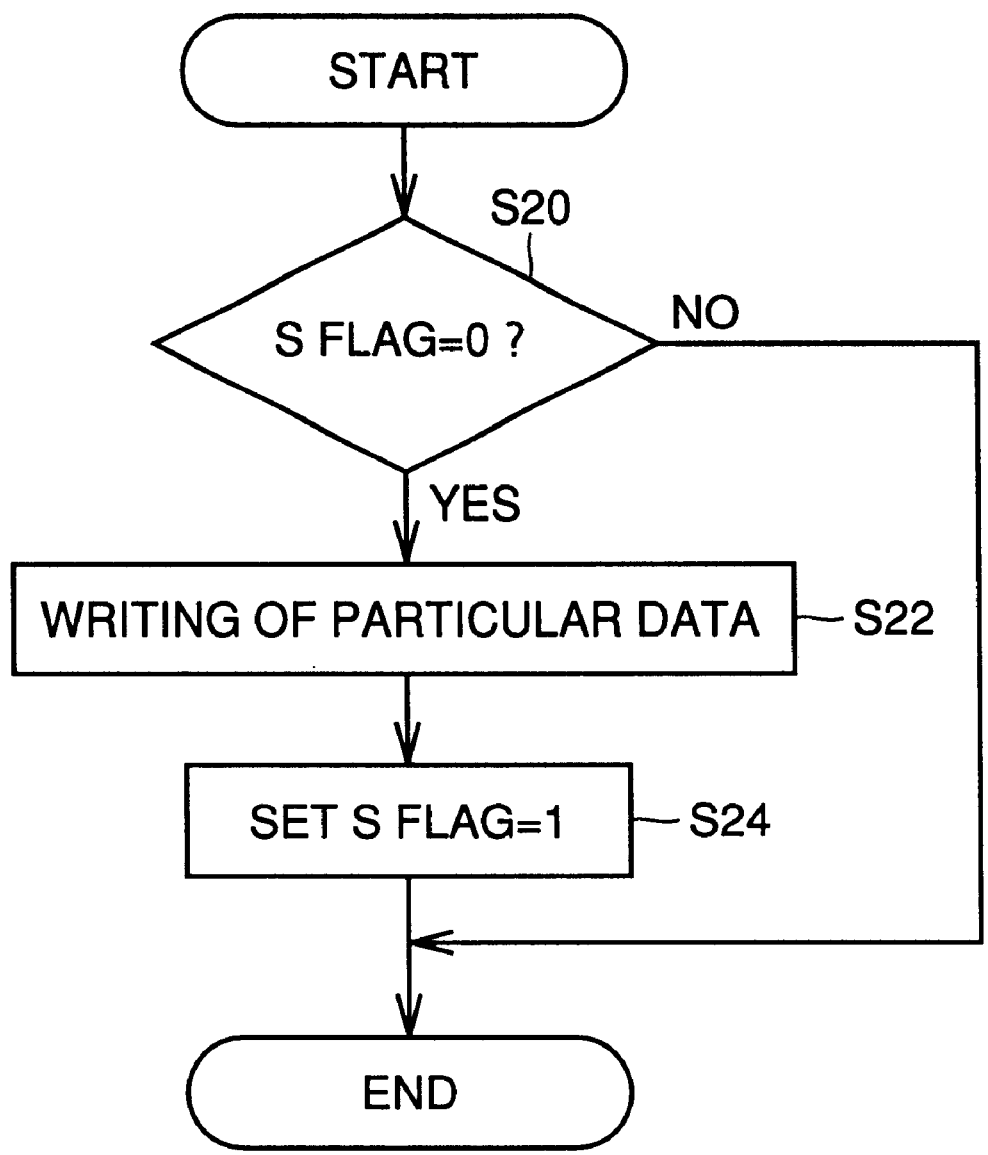
FIG. 10 is a flow chart of a particular data writing process.
Figure 11:
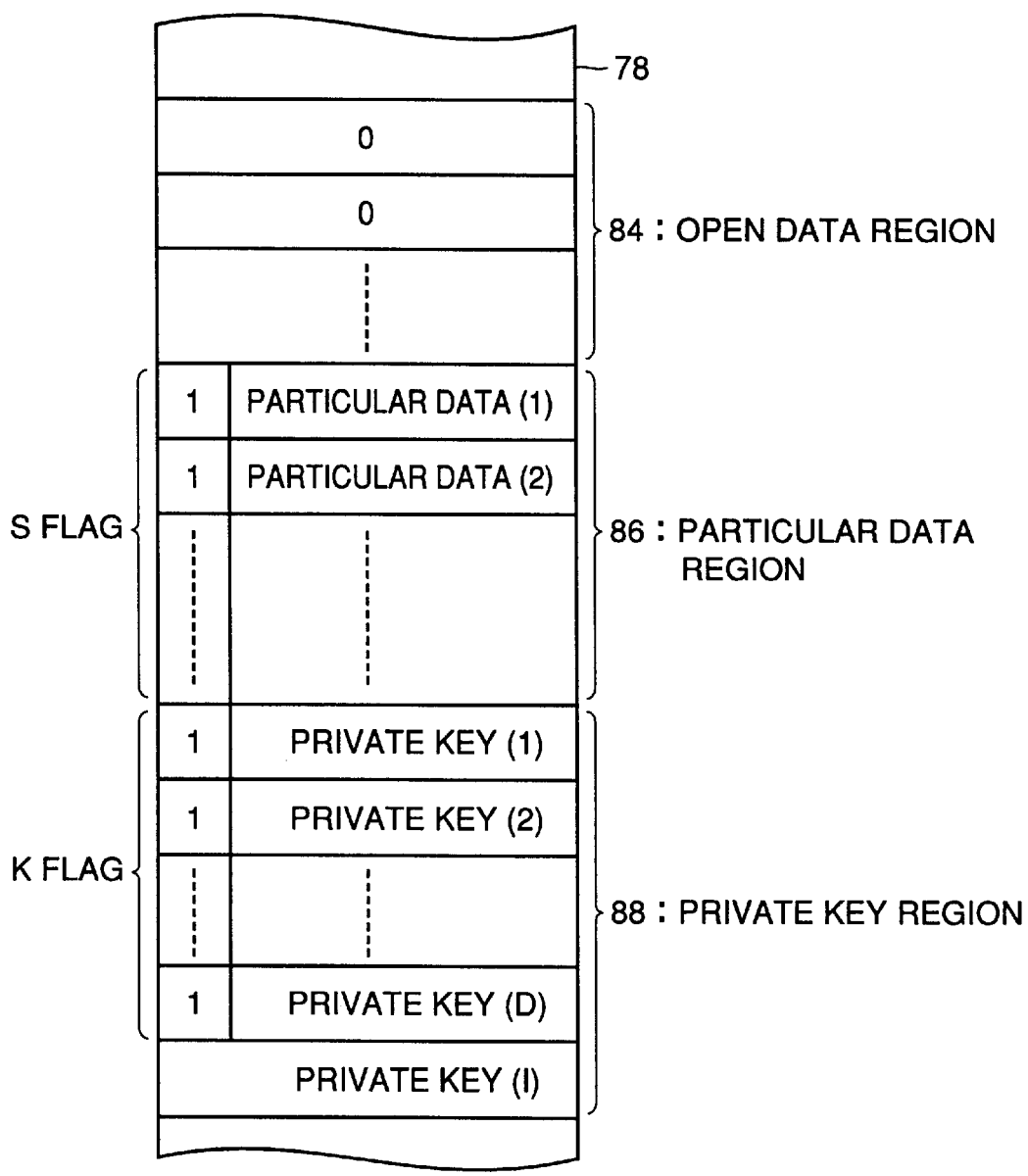

The particular data write process is represented by FIG. 10. Similar to the private key, writing is allowed on the condition that the S flag is 0 in writing particular data. Once particular data is written, the S flag is set to 1 to disable rewriting. The contents of non-volatile memory 78 with particular data written in are shown in FIG. 11. The device type of interrogator 50 corresponding to the relevant card, the ID number issued to each depositor by the bank, and the like are preferably stored as particular data. This is because rewriting such data of high secrecy has the high possibility of being related to improper usage.

Once the private key or the particular data is written, flags K and S of the relevant area are set to 1 to disable rewriting. In other words, writing is limited to only once. Thus, operability is improved by allowing the private key and particular data to be written in by the ATM manufacturer and the bank while preventing improper rewriting to improve the security.

In the present embodiment, IC card 30 of no further use is collected and processed by the IC card manufacturer to allow reusage of the IC card. This process is carried out by the IC card maker using an initialization apparatus including an interrogator 50. More specifically, an initialization instruction of non-volatile memory 78 is transmitted from interrogator 50 of the initialization apparatus together with the private key for initialization (refer to FIG. 2). In response, CPU 76 of IC card 30 carries out the initialization process of FIG. 6. First, private key (I) for initialization is read out from non-volatile memory 78. Then, determination is made whether the transmitted private key matches the read out private key (I) (step S2). If they match, the area other than the area of private key (I) is initialized (here, set to 0) (step S4). Accordingly, the contents of non-volatile memory 78 is returned to its initial state as shown in FIG. 7, allowing reusage.

When the private keys do not match, determination of an improper initialization instruction is made to reject initialization. The initialization instruction may be rejected when a wrong private key for initialization is entered continuously for at least N times. This provides the advantage of preventing the attempt of entering sequentially the codes of all possible combination as the private key to achieve the private key improperly.

Thus, reusage of IC card 30 is allowed in addition to ensuring the security.

Figure 12:
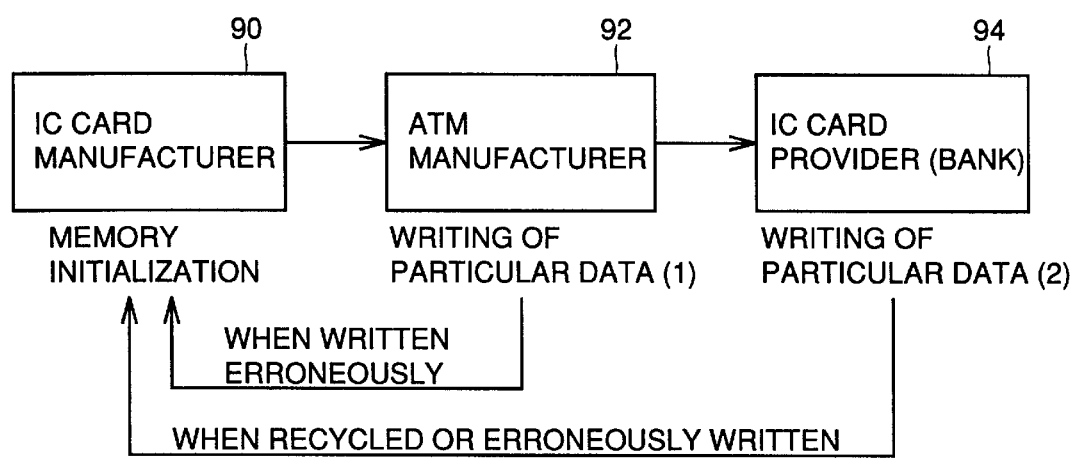
FIG. 12 shows the usage of an IC card and the reused status according to the present invention.

The reusage cycle of IC card 30 is schematically represented in FIG. 12. A manufacturer 90 of IC cards initializes non-volatile memory 78 and ships the IC card. The IC card is shipped with the program of access control for each data region (refer to the previous flow chart) written in.

A manufacturer 92 of ATMs receives the IC card and writes in a private key (1) and particular data (1). Also, the program for operation is written. This program can be read out/rewritten only by the relevant private key (1). This is preferable from the aspect of security since private key (1) is known only by ATM manufacturer 92. Neither IC card manufacturer 90 nor IC card provider 94 has knowledge of private key (1). Since rewriting, as well as read out of the private key and particular data is inhibited as described above, improper usage can be prevented.

IC card provider (bank) 94 receives IC card 30 in which the operation program is recorded to write in a private key (2) and particular data (2) (ID number for each depositor and the like). This is preferable from the standpoint of security since private key (2) and particular data (2) are known only by IC card provider 94 and the relevant depositor. IC card manufacturer 90 and ATM manufacturer 92 do not have knowledge of private key (2) and particular data (2). Since rewriting as well as read out of the private key and the particular data are inhibited, improper usage can be prevented.

IC card 30 of no further use (for example, expired in valid term) is returned to IC card manufacturer 90 to be initialized for reusage.

When private key (1) or particular data (1) is erroneously written in by ATM manufacturer 92, that information cannot be rewritten by ATM manufacturer 92 per se. The erroneously written IC card is passed to manufacturer 90 of the IC card. IC card manufacturer 90 initializes that card, and then delivers the initialized card to ATM manufacturer 92. A similar procedure is taken when private key (2) or particular data (2) is erroneously written by IC card provider 94.

By using such an IC card 30, reduction in the cost of the IC card by reusage can be realized in addition to the provision of a flexible IC card application and security for each business proprietor.

It is preferable to have only one interrogator particularly prepared for initialization owned by IC card manufacturer 90 for the sake of further improving the security.

[Second Embodiment]

Figure 13A:
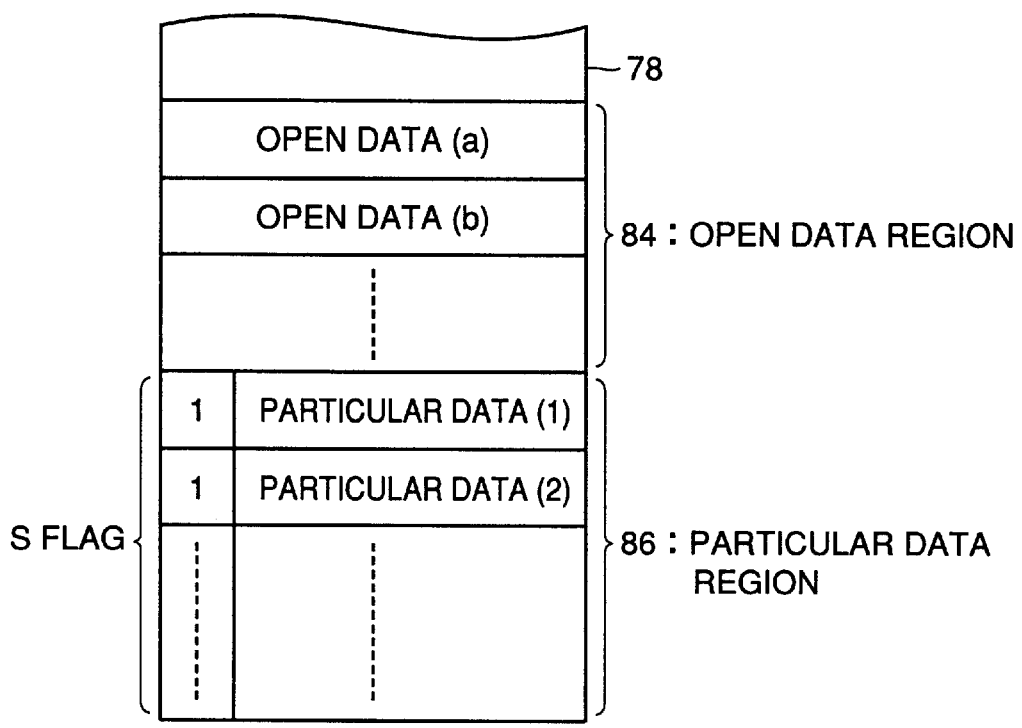
FIGS. 13A and 13B show the case where a private key is stored in an EPROM 100 according to a second embodiment of the present invention.
Figure 13B:
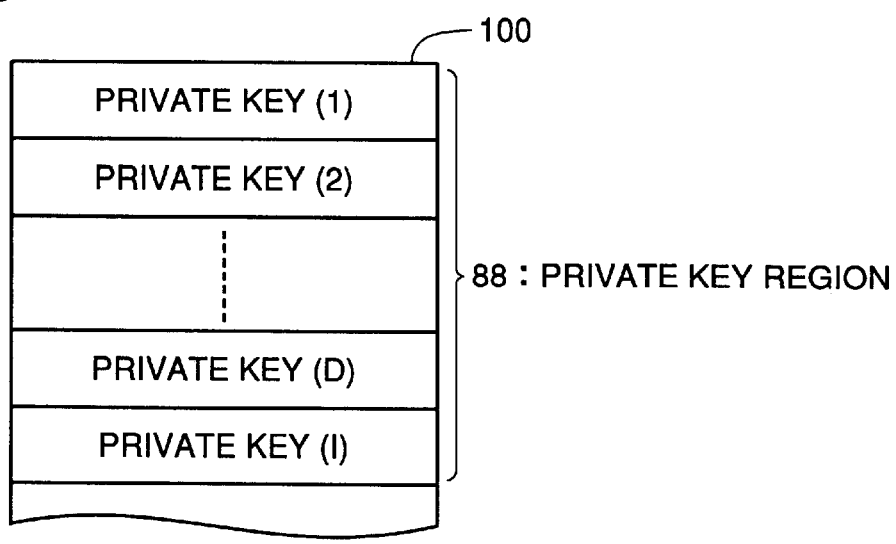

In the above first embodiment, an EEPROM is used for non-volatile memory 78. Only private key region 88 can be formed by an EPROM as shown in FIGS. 13A and 13B. The security can further be improved by disabling electrical rewriting.

Furthermore, rewriting can be substantially inhibited by disabling ultraviolet radiation on the EPROM. In this case, each private key is notified in advance from the ATM manufacturer and the card provider to have the IC card manufacturer write in each private key at the fabrication stage of the IC card. Although the private key cannot be rewritten, particular data can be rewritten to allow reusage.

Figure 14:
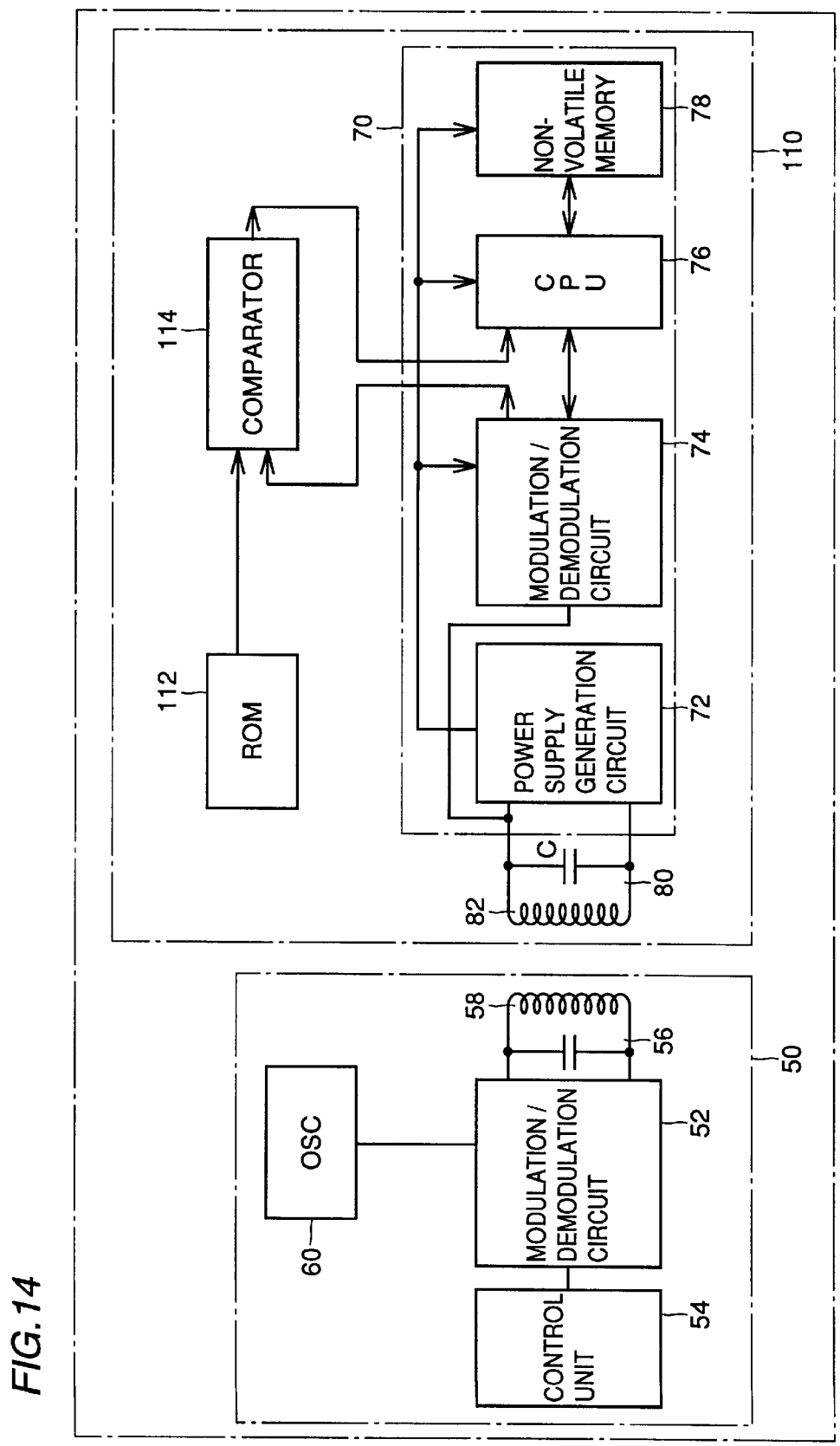
FIG. 14 shows the case where a comparator 11 for a private key (I) is provided in the second embodiment of the present invention.

Since private key (I) corresponding to the IC card manufacturer does not have to be changed, this mask can be exclusively formed by a mask ROM. In contrast to the initialization process using private key (I) according to the program of FIG. 6, the initialization process can be carried out by providing a comparator 14 as shown in FIG. 14. More specifically, private key (I) is stored in a ROM 112. Comparator 114 responds to an instruction from CPU 76 to compare the decoded private key with private key (I) stored in ROM 112. When they match, comparator 114 outputs a match signal to CPU 76. When they do not match, a mismatch signal is output. CPU 76 determines whether the sent private key is proper or not according to the match signal/mismatch signal from comparator 114.

[Third Embodiment]

Figure 15:
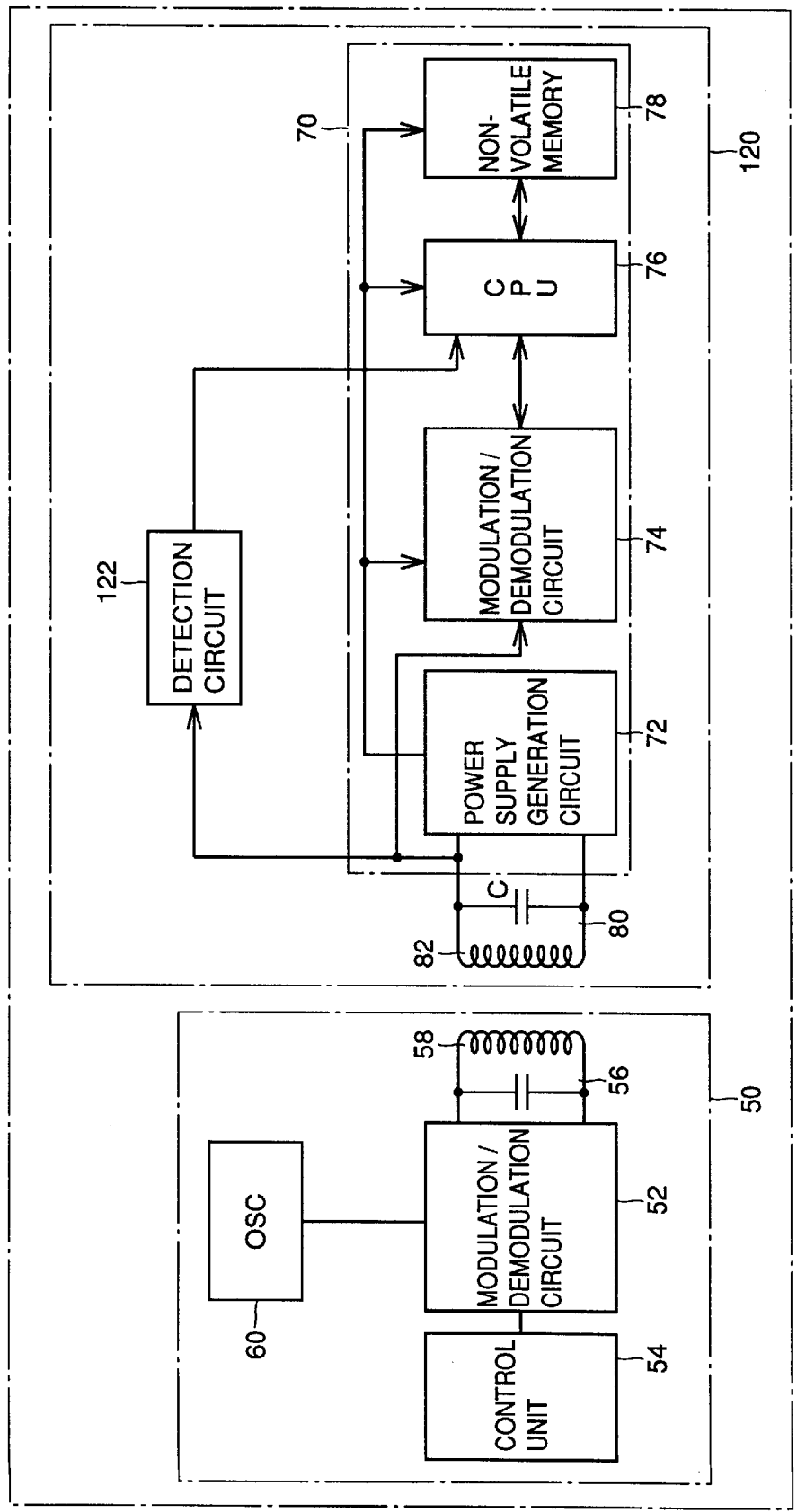
FIG. 15 shows the case where a detection circuit 122 for initialization is provided in a third embodiment of the present invention.
Figure 16:
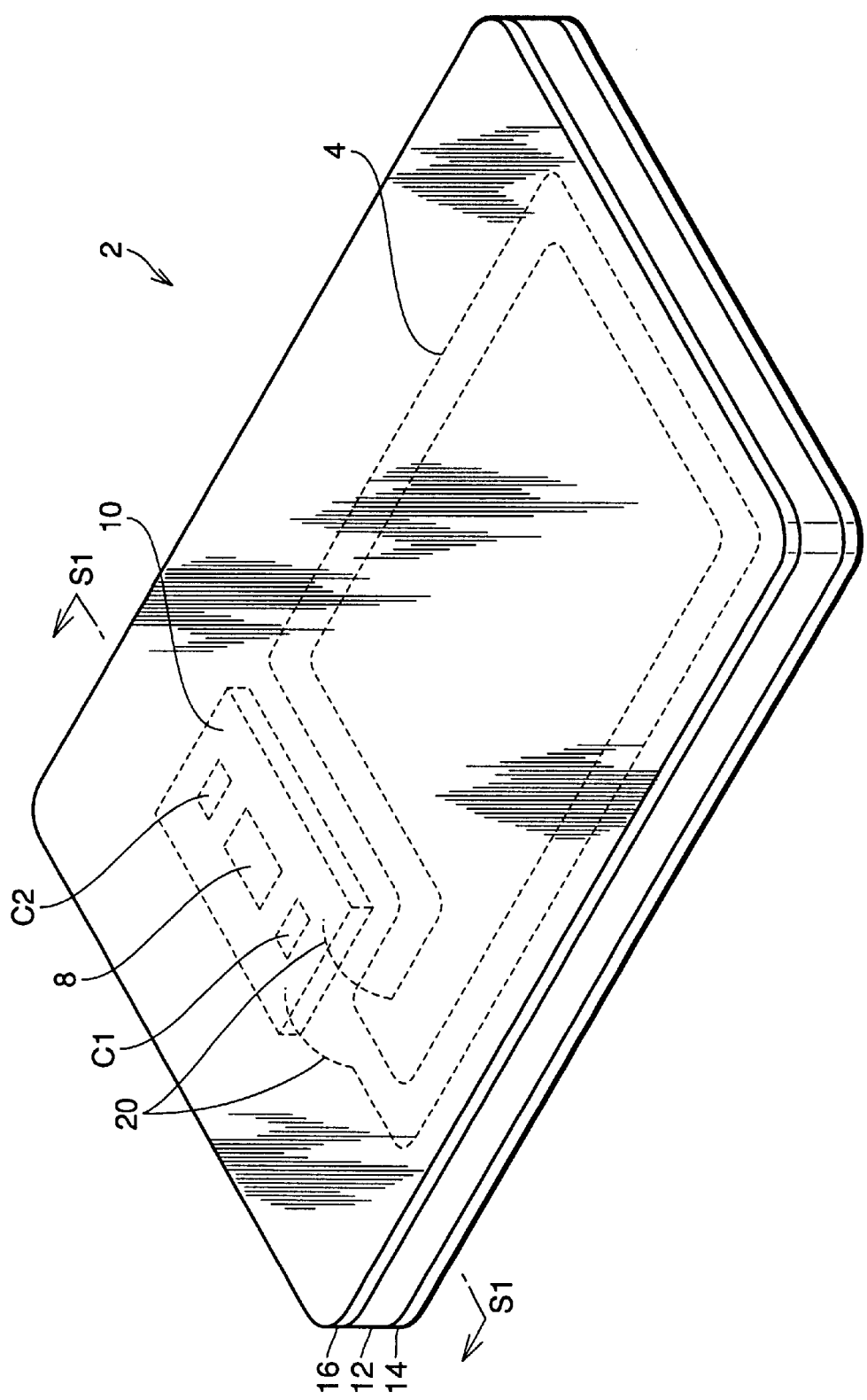
FIG. 16 shows an example of a conventional non-contact type IC card.

A third embodiment of the present invention associated with initialization of an IC card will be described hereinafter. FIG. 15 is a block diagram showing a hardware structure of an IC card according to a third embodiment of the present invention. In the present embodiment, a card initialization instruction corresponds to the application of a signal of a frequency differing from the general reception frequency.

For example, a predetermined intermittent signal is output at a predetermined frequency aside from the harmonic component of the resonance frequency of resonant circuit 80. Detection circuit 122 of IC card 120 has a bandpass filter that detects only that predetermined frequency. Detection circuit 122 outputs a detection signal only when that relevant frequency is detected. When a signal of that frequency is received intermittently, a detection signal is output according to that intermittent signal. CPU 76 receives this detection output signal to determine whether it matches a predetermined intermittent pattern. CPU 76 executes the process of step S4 of FIG. 6, i.e., the memory is initialized only when the intermittent pattern matches.

When there is no incoming signal of that frequency, or when the transmitted intermittent pattern does not match the predetermined pattern, initialization is not carried out. Therefore, initialization cannot be effected without interrogator 50 prepared particularly for initialization. Thus, security can be further improved.

In the above embodiments, the data between the interrogator and the IC card is transmitted without being encrypted. However, predetermined encryption can be applied for transmission. Furthermore, the private key used as a password in the above embodiments can be used as a cipher key for encryption to store data in cipher and transmit data in cipher.

In the above embodiments, the program is processed to inhibit read out and writing when the private key is improper. Alternatively, a signal inhibiting operation can be applied to the chip enable terminal and the like of non-volatile memory 78 to inhibit read out and writing in hardware when determination is made of an improper private key by CPU 76.

The above embodiments are described for the application of an IC card corresponding to an ATM. However, the present invention can be applied to an IC card for lifts in skiing grounds, a commentator ticket of railroad, a pass for express highways and the like. In other words, the present invention is applicable to the case where the manufacturer of apparatus corresponding to a card or provider of the card is to store particular data individually.

The portion of each function in FIG. 1 realized by a program using a CPU in the above embodiments can be implemented by hardware logics. Also, the portion realized by hardware logics can be implemented by a program.

Although the above embodiments describe a card for data communication in an electrically non-contact manner via an electromagnetic wave, the present invention is applicable to a card of data communication when in contact electrically.

"Particular data read out control means" corresponds to the means of controlling the permission/denial of reading out particular data according to a private key. For example, steps S30 and S32 of FIG. 4 correspond to the same in the embodiment.

"Particular data write control means" corresponds to the means of controlling so that particular data can be written just once into the data storage unit. For example, steps S20, S22 and S24 of FIG. 10 correspond to the same in the embodiment.

"Data initialization means" corresponds to the means of initializing at least a portion of or all of the particular data region in the data storage unit. For example, steps S2 and S4 of FIG. 6, or comparator 114 of FIG. 14, or detection circuit 122 of FIG. 15 correspond to the same in the embodiments. Here, data initialization implies that particular data can be written again. Therefore, not only erasing the particular data to allow rewriting of the S flag, but also rendering the S flag to a rewritable state while leaving particular data is included.

Figure 6:
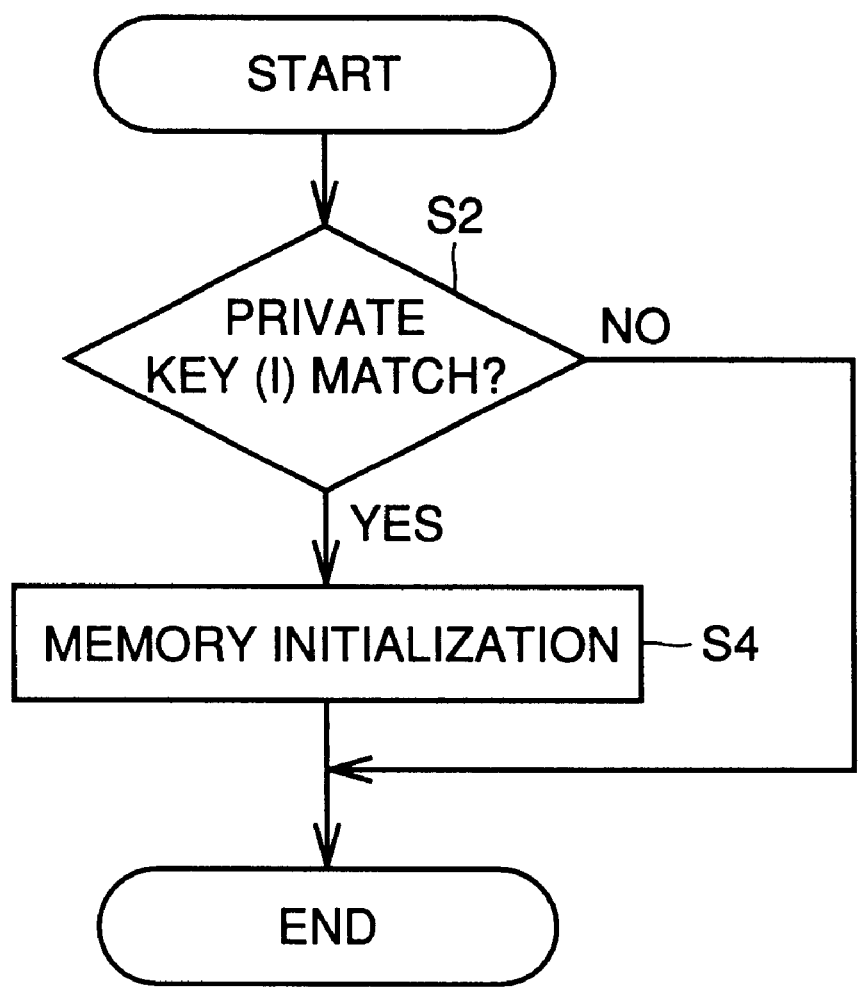
FIG. 6 is a flow chart of an initialization process.

"Private key initialization means" corresponds to the means of initializing a portion of or all of the private key. For example, steps S2 and S4 of FIG. 6, comparator 114 of FIG. 14, or detection circuit 122 of FIG. 15 correspond to the same in the present embodiments.

Here, initialization of a private key implies that the private key is rendered rewritable. Therefore, the concept includes, not only the case where the private key is erased and the K flag is set to a rewritable state, but also rendering the K flag rewritable while leaving the private key.

"Private key write control means" corresponds to the means of controlling so that a private key can be written just once into the private key storage unit. For example, steps S10, S12 and S14 of FIG. 8 corresponds to the same in the embodiments.

Industrial Applicability

According to the present invention, an IC card of high security and that can be recycled is provided. The present invention is advantageously applicable to the field of fabricating, selling, or using an IC card.

What is claimed is:

1. An IC card comprising:

data communication means for carrying out data communication with an interrogator;

a data storage unit storing data, said data storage unit comprising a particular data region storing particular data and a flag corresponding to a particular data and a private key region for storing private keys;

access control means for controlling access to said data storage unit according to data obtained from said data communication means, wherein said access control means comprises data initialization means for initializing said data storage unit according to a predetermined data initialized instruction obtained from said data communication means by setting said flag in a write enable state, particular data write control means for providing control to allow predetermined particular data for card application to be written to said particular data region when said flag is in a write enable state and for setting said flag to a write disable state when said particular data is written into said particular data region, characterized in that a private key for initialization is stored in said private key region and wherein said data initialization means resets said flag by means of said initialization instruction only when a transmitted key for initialization matches said private key for initialization and wherein said data initialization instruction comprises the application of a signal having a predetermined frequency differing from the general reception frequency; and a detection circuit for detects said predetermined frequency of said signal and wherein said data initialization means initializes said data storage unit only when said signal having said predetermined frequency is detected.

2. The IC card according to claim 1, further comprising a private key storage unit storing a private key to access particular data stored in said data storage unit, wherein said access control mean further comprises particular data read out control means for controlling so that the particular data can be read out only when a relevant private key is input.

3. The IC card according to claim 2, wherein said particular data write control means is characterized by controlling so that said particular data can be written into said data storage unit that is initialized by said data initialization means, only when said private key is input or wherein said access control means comprises private key initialization means or initializing said private key storage unit according to a predetermined private key initialization instruction obtained from said data communication means, and private key write control means for controlling so that a private key can be written into said private key storage unit that is initialized by said private key initialization means.

4. The IC card according to claim 1 or 2, characterized in that said data storage unit can also store open data unlimited in the number of read out and rewriting times.

5. The IC card according to claim 4, characterized in that said private key storage unit stores a private key to access the open data stored in said data storage unit, and said access control means provides control to allow said open data to be rewritten only when said private key to access the open data is input.

6. The IC card according to claim 1, characterized in that said data communication means carries out data communication with said interrogator electrically in contact.

7. The IC card according to claim 1, characterized in that said data initialization instruction is data encrypted by a predetermined method, and said data initialization means initializes said data storage unit only when said encrypted data is recognized as a data initialization instruction.

8. The IC card according to claim 1, characterized in that said data communication means carries out data communication with said interrogator via an electromagnetic wave in an electrically non-contact manner.

9. A method of using are IC card according to claim 1 that carries out data communication with an interrogator and that stores data in a data storage unit wherein initialization of said IC card is allowed only when a predetermined initialization condition is satisfied wherein a private key read out from said data storage unit matches with a private key transmitted, and predetermined particular data is allowed to be written into an initialized IC card, wherein said initialization resets a flag corresponding to a particular data, characterized in that said initialization is carried out by an initialization instruction comprising a signal of a frequency differing from the general reception frequency.

10. A method according to claim 9, characterized in that said initialization is carried out by an IC card manufactures and said particular data is written by a provider of said IC card or said manufacturers of said interrogator.

* * * * *

UNITED STATES PATENT AND TRADEMARK OFFICE
CERTIFICATE OF CORRECTION

PATENT NO. : 6,742,117 B1
DATED : May 25, 2004
INVENTOR(S) : Hikita et al.

It is certified that error appears in the above-identified patent and that said Letters Patent is hereby corrected as shown below:

Title page,
Item [56], References Cited, U.S. PATENT DOCUMENTS, please add the following reference:
-- 4,442,345    4/1984        Mollier et al. --

Signed and Sealed this

Twenty-second Day of March, 2005

JON W. DUDAS
*Director of the United States Patent and Trademark Office*